US007907595B2

(12) United States Patent
Khanna et al.

(10) Patent No.: US 7,907,595 B2
(45) Date of Patent: Mar. 15, 2011

(54) METHOD AND APPARATUS FOR LEARNING ENDPOINT ADDRESSES OF IPSEC VPN TUNNELS

(75) Inventors: Bakul Khanna, Lexington, MA (US);
John Chao, Belmont, MA (US);
Ramasamy Jesuraj, Westford, MA (US); Robert Lee, Lexington, MA (US)

(73) Assignee: Avaya, Inc., Basking Ridge, NJ (US)

( * ) Notice: Subject to any disclaimer, the term of this patent is extended or adjusted under 35 U.S.C. 154(b) by 303 days.

(21) Appl. No.: 11/540,104

(22) Filed: Sep. 29, 2006

(65) Prior Publication Data
US 2008/0080509 A1    Apr. 3, 2008

(51) Int. Cl.
*H04L 12/28*    (2006.01)
*H04L 12/56*    (2006.01)
(52) U.S. Cl. .................................... 370/351; 370/892
(58) Field of Classification Search .................. None
See application file for complete search history.

(56) References Cited

U.S. PATENT DOCUMENTS

| 7,280,534 | B2* | 10/2007 | Koppol ............... | 370/352 |
| 7,373,660 | B1* | 5/2008  | Guichard et al. ........ | 726/15  |

| 2002/0181477 | A1* | 12/2002 | Mo et al. ............... | 370/401 |
| 2005/0188106 | A1* | 8/2005  | Pirbhai et al. .......... | 709/238 |
| 2007/0110025 | A1* | 5/2007  | Guichard et al. ....... | 370/351 |
| 2007/0206597 | A1* | 9/2007  | Asati et al. ............ | 370/392 |
| 2007/0248091 | A1* | 10/2007 | Khalid et al. .......... | 370/392 |
| 2007/0260746 | A1* | 11/2007 | Mirtorabi et al. ....... | 709/238 |

OTHER PUBLICATIONS

RFC 2547, Mar. 1999.*

* cited by examiner

*Primary Examiner* — Hong Cho
*Assistant Examiner* — Eunsook Choi
(74) *Attorney, Agent, or Firm* — Anderson Gorecki & Manaras LLP

(57) ABSTRACT

Customer Edge (CE) network elements can automatically learn IPSec tunnel endpoints for other CEs connected to sites in a Virtual Private Network (VPN) so that manual configuration of IPSec tunnel endpoints is not required and so that a centralized database of IPSec tunnel endpoints is not required to be separately maintained. According to an embodiment of the invention, a BGP export route policy is set on all CEs, so that when they announce their VPN routes in the standard format, the application of this export route policy changes the announcement to replace the BGP peering point address that would ordinarily be advertised with the IPSec tunnel endpoint address. When any given site receives a VPN route update formatted in this manner, it processes the VPN route update and learns from the update the IPSec tunnel endpoint as well as the associated VPN routes.

17 Claims, 3 Drawing Sheets

METHOD AND APPARATUS FOR LEARNING ENDPOINT ADDRESSES OF IPSEC VPN TUNNELS

CROSS REFERENCE TO RELATED APPLICATIONS

This application is related to U.S. patent application Ser. No. 11/540,198, filed Sep. 29, 2006, entitled Method And Apparatus For Supporting Multiple Customer Provisioned IPSec VPNs, the content of which is hereby incorporated herein by reference.

BACKGROUND OF THE INVENTION

1. Field of the Invention

The present invention relates to communication networks and, more particularly, to a method and apparatus for learning endpoint addresses of IPSec VPN tunnels.

2. Description of the Related Art

Data communication networks may include various computers, servers, nodes, routers, switches, bridges, hubs, proxies, and other network devices coupled together and configured to pass data to one another. These devices will be referred to herein as "network elements." Data is communicated through the data communication network by passing protocol data units, such as data frames, packets, cells, or segments, between the network elements by utilizing one or more communication links. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how packets should be handled or routed through the network by the network elements, and how information associated with routing information should be exchanged between the network elements. Two networks with the same network topography may operate in completely different ways depending on the particular protocols selected to enable the network elements to interoperate.

FIG. 1 illustrates an example communication network 10 in which VPN tunnels may be established to interconnect CEs connected to one or more VPN sites. As shown in FIG. 1 a service provider provides interconnectivity amongst Customer Edge (CE) network elements 12. A CE device 12 is a device which connects one or more VPN sites 14 to a Provider Edge node 16. Essentially, a CE device allows one or more VPN sites to interconnect with an external network so that one or more VPN sites may be interconnected over the communication network 10.

A Provider Edge (PE) node is a router which connects to one or more CE devices using a dynamic routing protocol to exchange CE reachability information. The PE connects with at least one other PE or P node. When handling Internet Protocol (IP) MultiProtocol Label Switched (MPLS) traffic, a PE node acts as a Label Edge Router which terminates Label Switched Path (LSP) tunnels used to forward traffic to other PE nodes. PE nodes may be directly connected to other PE nodes, or may be connected through other network elements such as backbone routers 18.

Backbone routers 18 are commonly designated in the industry by the letter P. The Provider "P" routers are backbone routers which provide interior gateway protocol connectivity between PE nodes. It may be possible for a given router to act as a PE node for some VPNs and as a P router for other VPNs, however, depending on the configuration of the communication network.

A Virtual Private Network (VPN) may be formed by securing communications between two or more networks or network elements to form a VPN tunnel, such as by encrypting or encapsulating transmissions between the networks or network elements. Using VPN tunnels enables geographically dispersed VPN sites to exchange information securely without obtaining dedicated resources through the network.

There are several common ways of establishing VPN tunnels on a network. For example, VPNs may be established by customers through the deployment of CE network elements configured with VPN software. One common way to implement a CE-based VPN is through the use of Internet Protocol Security (IPSec) tunnels through the communication network. IPSec based VPNs use point-to-point IPSec tunnels formed using an IPSec Security Association (SA) between every pair of sites. As the number of sites in the VPN grow, this point-to-point solution does not scale, since the number of SAs required to implement the VPN will increase on the order on $n^2$. To overcome this, it is possible to use a single SA for all sites in the VPN, for example administered via a Group Controller Key Server (GCKS).

Another way of establishing VPNs is to configure the VPN at the Provider Edge (PE) network elements to allow the service provider to provision VPN services on behalf of the customer. One common way to do this is described in Internet Engineering Task Force (IETF) Request For Comments (RFC) 2547, the content of which is hereby incorporated herein by reference. RFC 2547 describes a VPN architecture in which MultiProtocol Label Switching (MPLS)-based tunnels are used to forward packets over the network backbone. A protocol referred to as Border Gateway Protocol (BGP) is used to distribute routes over the backbone for VPNs provisioned through a particular PE network element. Routing information for the Provider-Provisioned VPNs is stored in a VPN routing and forwarding table (VRF) or a distinguishable area of the PE's common VRF.

In a CE-based VPN, to enable devices on one VPN site to communicate with devices on another VPN site via an IPSec VPN tunnel, it is necessary to exchange VPN routing information between the two CEs connected to the VPN sites. The routing information enables the CEs to learn which VPN addresses may be reached via the VPN. As VPN sites and network elements are added and removed from the networks, the new routing information will be advertised to the other CEs connected to participating sites in the VPN.

Where Multiprotocol Border Gateway Protocol (MPBGP) is being used to distribute VPN routing information, a given CE will establish an MPBGP peering session with every other CE with which it would like to exchange routing information. Where there are many CEs in the VPN, the GCKS may also serve as a route reflector to enable BGP routes to be exchanged between the various CEs by causing each CE to establish a single peering session with the route reflector, which will then distribute the routes to the other CEs.

When a CE learns a VPN route from an attached VPN site, it will formulate an MPBGP route advertisement so that the new route may be advertised to CEs connected to the other VPN sites associated with that VPN. The route advertisement will include the CE's MPBGP peering point address as the BGP-nexthop field in the route update, so that any traffic destined to this route will be sent to the CE as the next-hop.

Although MPBGP will cause the MPBGP endpoint addresses to be distributed, the MPBGP peering endpoint is not able to be used as the endpoint of an IPSec tunnel. The reason for this is that if the destination IP address of the MPBGP packet is the same as the tunnel endpoint address, this MPBGP packet will not get encrypted, since the only packets that are supposed to have a destination IP address of the tunnel endpoint are already encrypted packets, and we don't want to encrypt them again. This is the classic recursive encryption problem. Hence application packets that are candidates for encryption typically need to have destination IP address beyond the IPSec tunnel endpoint.

Thus, where IPSec is used to implement the VPN tunnels between CE network elements, and MPBGP is to be used as a routing protocol for exchange of VPN routes, the IPSec tunnel endpoints must also be distributed to the other CEs, so that the CEs may address encrypted traffic to the correct IPSec tunnel endpoints for the VPN routes.

There are several ways in which the IPSec tunnel endpoints may be learned by CEs. For example, a user may manually configure all IPSec tunnel endpoints on every CE. While this will work for small numbers of CEs, this solution is not scalable and may be difficult to implement or administer for large number of CEs.

Another way for CEs to learn IPSec tunnel endpoints may be for the GCKS to maintain a complete list of the IPSec tunnel endpoints for all CEs connected to sites in the VPN. When a new VPN joins the CE, and registers with the GCKS, the GCKS could then transmit a complete list of the IPSec tunnel endpoints for all other CEs. One downside to this is that it is necessary for the GCKS to maintain and update the VPN membership lists with this additional piece of information.

Another way to enable CEs to learn of IPSec tunnel endpoints of the other CEs is to define a new BGP Subsequence Address Family Identifier (SAFI) (see IETF RFC 2858) that may be used to specifically communicate the association of the IPSec tunnel endpoint with the MPBGP peering point on any given CE, to all other CEs. Although this would enable the CEs to communicate the IPSec tunnel endpoints directly with each other, doing so would require the MPBGP code to be enhanced to include this new SAFI functionality.

Yet another way to enable a CE to learn the IPSec tunnel endpoints of the other CEs is to use Next Hop Resolution Protocol (NHRP) to dynamically determine the tunnel endpoint addresses. The arrival of a first packet to a VPN destination at a CE would trigger the CE to use NHRP to determine the tunnel endpoint address that should be used to forward traffic on the route. Although this overcomes the problems associated with having the GCKS maintain a list of IPSec tunnel endpoint addresses, the amount of time required to dynamically determine the tunnel endpoint addresses may cause the first several packets to be dropped by the CE.

SUMMARY OF THE INVENTION

A method and apparatus enables a CE to automatically learn the IPSec tunnel endpoint for other CEs in the enterprise. By enabling automatic learning, there is no need for manual configuration of all other IPSec tunnel endpoints on a CE, also CEs can enter and leave the enterprise without requiring manual reconfiguration of the IPSec endpoints information in the other remaining CEs. According to an embodiment of the invention, a BGP export route policy is set on all sites, so that when they announce their VPN routes in the MPBGP standard format, the application of this export route policy changes the announcement to replace the BGP-next hop field with the IPSec tunnel endpoint address. When any given CE receives a VPN route update formatted in this manner, it processes the VPN route update and learns from the update the IPSec tunnel endpoint instead of the MPBGP peering address. The VPN route update will also include route information and be formatted in a normal manner. The IPSec tunnel endpoint may then be directly associated with the VPN routes without requiring a separate determination of the IPSec tunnel endpoint address.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
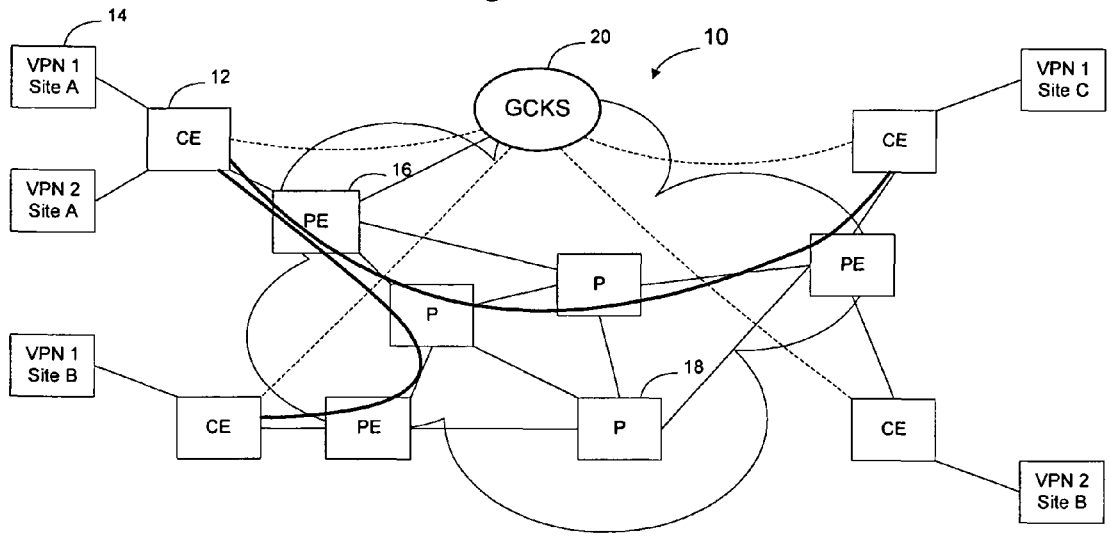
FIG. 1 is a functional block diagram of a portion of an example communication network.
Figure 2:
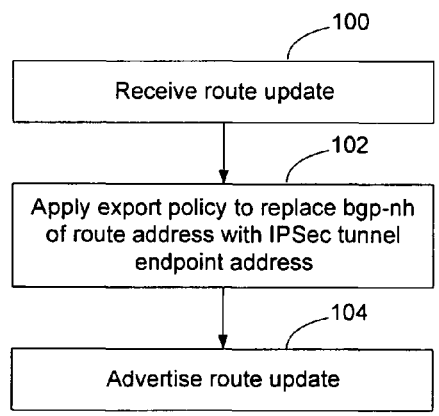
FIG. 2 is a flow chart of a process of learning the endpoint addresses of VPN tunnels according to an embodiment of the invention.
Figure 3:
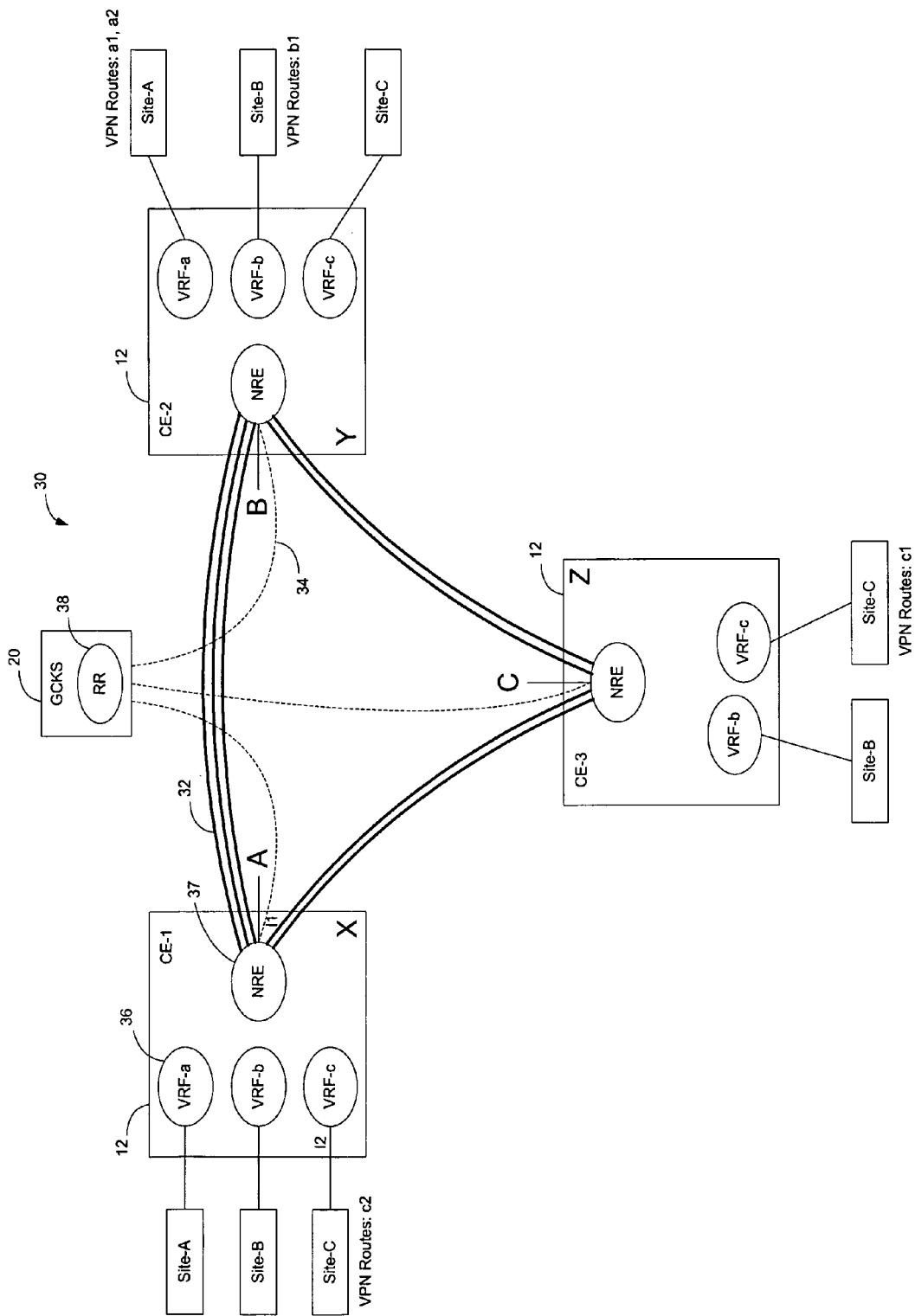
FIG. 3 is a functional block diagram of a communication network according to an embodiment of the invention.

FIG. 2 shows a process that may be used to enable endpoint addresses of IPSec VPN tunnels to be learned by CEs on a communication network such as the communication network of FIG. 3. According to an embodiment of the invention, the CE network elements implement IETF RFC 2547 to implement a VRF for each VPN site. As shown in FIG. 2, when a CE network element receives a route update from VPN site (100) it will store this route in the appropriate VRF. It will then create an MPBGP route with the route update received from VPN site and also apply an export policy to change the route update so that the IPSec tunnel endpoint address is included in the route update, in the BGP-nexthop field, before the route update is advertised on the network (102). The CE will then advertise the route update (104). By using an export policy to change the address to the IPSec tunnel endpoint address, the other CEs may directly learn the correct address to be used to transmit IPSec tunnel data to the target CE.

In MPBGP, the standard format for a route is for the route to include the BGP peering point address as the next hop. Routes of this nature will be represented herein as: <RD: prefix, BGP-nh, RT>, in which RD is the route distinguisher (the RD makes VPN addresses unique in case of overlapping IP addresses in different VPNs), BGP-nh is the next hop for the route, and RT is the route target. The route target is generally used to identify the VPN to which the route belongs. The format of BGP routes is well known in the art. Generally, when a CE advertises a route, it will set BGP-nh to be the MPBGP peering point. According to an embodiment of the invention, the BGP-nh attribute of a conventional route advertisement is set to the IPSec endpoint address before being advertised, so that the other CEs can learn the IPSec tunnel endpoint rather than the BGP peering point.

FIG. 3 illustrates an example communication network 30 in which VPN tunnels 32 have been configured between CEs implemented as CEs 12. Addresses A, B, C, and D are the public addresses of the CEs 12 and the GCKS 20, and are also the IPSec tunnel endpoints for secure data channels (tunnels 32) that extend between the VPN sites. Secure control channels 34 extend between the GCKS 20 and each of the CEs 12. In FIG. 3, X, Y, Z, and W are MPBGP peering points that may be used to exchange MPBGP routes. As discussed above, the MPBGP peering point addresses cannot be the same as the IPSec tunnel addresses A, B, C, D if IPSec encryption is to be used to implement the VPN tunnels (secure data paths).

When a CE comes up, the CE will register with the GCKS 20 and establishes a secure control channel 34 with the GCKS. The secure control channel is represented as an unnumbered IP interface on the CE and terminates at the Network Routing Engine (NRE) 37 on the CE. The NRE, in this context, is a Linux process containing the routing protocols and routing table for the service provider network. The NRE may be configured to operate as specified in IEEE RFC 2547. A single BGP session runs between each CE and the GCKS over the secure control channel 34 regardless of the number of VPNs at the CE.

For each Virtual Routing and Forwarding (VRF) 36 the CE 12 will establish a secure data channel 32, which may be implemented as an IPSec tunnel. The secure data channel is also represented as an unnumbered IP interface that terminates at the NRE. The NRE in the CE maintains a mapping between import Route Target (RT) to VRF to enable the NRE to populate the correct VRFs with the VPN routes received from other CEs.

In the network shown in FIG. 3, MPBGP may be used by the CEs to exchange routes (i.e. via the route reflector 38), although in a network with only several CEs, the CEs may also exchange routes with each other directly via individual peering sessions. The MP-BGP extension for ipv4-vpn route exchange may be used in this context to exchange routes between the CEs directly or via the route reflector.

In MPBGP, the standard format for a route is for the route to include the BGP peering point as the next hop. Generally, when a CE advertises a route, it would set BGP-nh to be the MPBGP peering point. Thus, in the example communication network shown in FIG. 3, CEs typically would advertise routes using the addresses of the MPBGP peering points X, Y, Z, and W. However, as discussed above, since the IPSec tunnel endpoint address must be different than the MPBGP peering point address, according to an embodiment of the invention, an export policy may be configured at each CE (not at the GCKS) to change the BGP-nh field in each announced route so that the BGP-nh field is the public address of the CE or IPSec tunnel endpoint rather than the MPBGP peering endpoint. By doing this, other CEs can use this IPSec tunnel endpoint for all traffic directed to this CE, if the other CEs use the MPBGP peering point for all traffic directed at this CE, then BGP traffic would not get encrypted, since the BGP peering point would be the same as the tunnel endpoint.

In the example communication network shown in FIG. 3, assume that VPN Site-C on CE1 contains route c2. CE1 will generate an MPBGP message <RD:c2, X, RTc>, in which c2 is the route, X is the MPBGP peering endpoint of the secure control channel 32 that terminates with CE1, and RTc identifies the route as belonging to VPN c implemented by VRF c. Before this message is advertised (i.e. sent to the GCKS over the secure control channel 58), the message will be changed to: <RD:c2, A, RTc> in which A is the endpoint address of the IPSec tunnel associated with CE-1. After the MPBGP peering endpoint has been changed to the IPSec tunnel endpoint address or the public address of the CE, the message may be advertised.

It will be assumed now that CE 1 has just come up. Once a secure control channel has been established with the GCKS, CE 1 will learn of route c2 from VPN site CPE-C. If the export policy in VRF-c is to export the route, the route will be formatted as discussed above to include the IPSec tunnel endpoint as the target address for the route. Thus, CE 1 will send a message <RD:c2, A, RTc> to the GCKS.

The GCKS will have received similar messages from the other CEs (CE 2 and CE 3). Specifically, assume that CE 2 has advertised routes for a1, a2, and b1, and that CE 3 has advertised routes for c1. The GCKS will transmit the following messages to CE1: <RD:a1, B, RTa>; <RD:a2, B, RTa>; <RD:b1, B, RTb>; <RD:c1, C, RTc>. Since the CEs all used the IPSec tunnel endpoint in the routes that they advertised, according to the export policy discussed above, CE 1 may learn all the IPSec tunnel endpoints from the advertised routes at the same time that it learns the VPN routes associated with each IPSec tunnel endpoint. Thus, no additional messages are required to convey the IPSec tunnel endpoints to the CE network elements on the VPN, and the GCKS is not required to maintain a separate list of IPSec tunnel endpoint addresses for transmission to the CE network elements on the VPN.

The Network Routing Engine (NRE) will maintain routing tables for the various routes that are learned by the CE. Initially, when the CE comes up, the NRE knows that addresses A, B, C, and D are reachable via interface I1. However, the per-VRF routing tables have not yet been populated and only contain local routes. Accordingly, the per-VRF routing tables for each of the VRFs at this point may be represented by Table 1:

TABLE 1

| Per-VRF routing table for VRF-a at CE1 after registration with GCKS and before any updates from BGP-Route reflector | | Per-VRF routing table for VRF-b at CE1 after registration with GCKS and before any updates from BGP-Route reflector | | Per-VRF routing table for VRF-c at CE1 after registration with GCKS and before any updates from BGP-Route reflector | |
|---|---|---|---|---|---|
| Prefix | Interface/ next hop | Prefix | Interface/ next hop | Prefix | Interface/ next hop |
| | | | | C2 | I2 |

As is shown in this table, before CE1 receives any routes from the route reflector, it has no knowledge of any of the routes and the per-VRF routing tables are mainly empty. Table 2 shows the per-VRF routing tables after receipt of the routing updates discussed above (i.e. after receipt of <a1, B, RTa>; <a2, B, RTa>; <b1, B, RTb>; <c1, C, RTc>).

TABLE 2

| Per-VRF routing table for VRF-a at CE1 after registration with GCKS and after updates from BGP-Route reflector | | Per-VRF routing table for VRF-b at CE1 after registration with GCKS and after updates from BGP-Route reflector | | Per-VRF routing table for VRF-c at CE1 after registration with GCKS and after updates from BGP-Route reflector | |
|---|---|---|---|---|---|
| Prefix | Interface/ next hop | Prefix | Interface/ next hop | Prefix | Interface/ next hop |
| A1 | B | B1 | B | C1 | C |
| A2 | B | | | C2 | I2 |

As may be seen from Table 2, the interface next hop value that is maintained by the CE in its routing tables is the IPSec tunnel endpoint or public address of the IPSec tunnel for that route, rather than the MPBGP peering endpoint. For local routes, such as route C2 on CE 1, the interface next hop is the local interface value. By advertising the IPSec tunnel endpoint, per export policy in the CE network elements, data traffic that will use the advertised routes may be encrypted and addressed to the IPSec tunnel endpoints. This enables the IPSec tunnel endpoints to be automatically discovered by the network elements without requiring the endpoints to be specifically communicated to the CEs forming the VPN tunnel endpoints.

The NRE will also maintain routing tables so that it is able to direct traffic being handled by the CE. Once the CE has registered with the GCKS and established the secure control channel, the interface table in the NRE will contain an entry for the secure control channel. As the VRFs register with the GCKS, the interfaces will be added to the interface table in the NRE. The invention is not limited by the particular manner in which the NRE maintains its interface tables.

As discussed above, standard route advertisements may be modified to include the IPSec tunnel endpoint rather than the MPBGP peering endpoint by using an export policy in the CEs. CE network elements commonly implement other types of export policies, such as policies related to which types of routes should and should not be advertised. Accordingly, implementation of this feature using an export policy would be expected to be able to be implemented in most CE network elements. The invention is thus not limited to the particular format of the export policy as different CEs may use different formats to implement the export policy described above.

Figure 4:
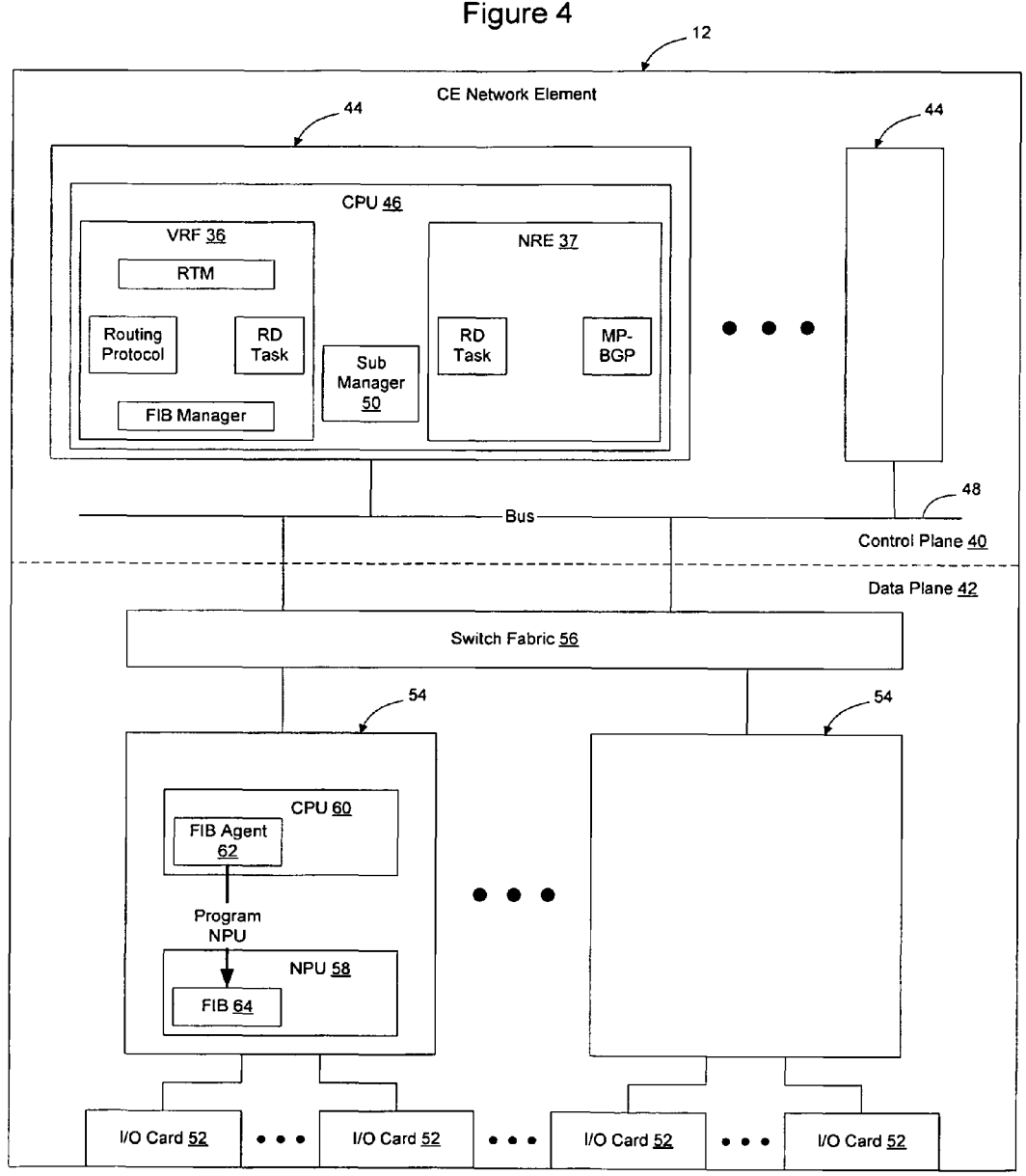
FIG. 4 is a functional block diagram of a CE network element according to an embodiment of the invention.

FIG. 4 shows an example of a CE network element 12 that may be configured to implement an embodiment of the invention. As shown in FIG. 4, the CE network element 12 generally includes a control plane 40 and a data plane 42. The control plane 40 is configured to control operation of the network element 12 by specifying how the data plane 42 should handle particular packets or classes of packets. The control plane generally includes control service cards 44, each of which includes one or more processors such as a CPU 46. A bus 48 may be provided to interconnect the control service cards 44 to enable data and instructions to be communicated between the CPUs 46 in the control plane 40. The CPUs may host VRFs 36, NRE 37, and other applications such as the sub-manager 50.

The network element 12 also includes a data plane 42 configured to handle packets of data on the communication network. The data plane 42 generally includes one or more Input/Output (I/O) cards 52, one or more data service cards 54, and a switch fabric 56. Packets received over the I/O cards 52 are passed to the data service cards 54, and then to the switch fabric 56. The switch fabric 56 enables a packet entering on a port on one or more I/O cards 52 to be output at a different port in a conventional manner. A packet returning from the switch fabric 56 is received by one or more of the data service cards 54 and passed to one or more I/O cards 52. The packet may be handled by the same data service card 54 on both the ingress and egress paths or may be handled by different data service cards 54 on the ingress and egress paths.

The I/O cards 52 are configured to connect to links in the communications network 10. The I/O cards 52 may include physical interfaces, such as optical ports, electrical ports, wireless ports, infrared ports, or ports configured to communicate with other physical media, as well as configurable logical elements capable of being programmed to implement interface definitions specified by an interface manager.

The data service cards 54 include one or more network processors 58 configured to perform network processing on packets of data received via the I/O cards. The data service cards 54 also may include a CPU 60 configured to host applications such as a FIB agent 62 that may be used to program the network processing unit 58. For example, the FIB agent 62 may be configured to program the NPU 58 to implement particular rules in the Forwarding Information Base 64. The invention is not limited to the particular manner in which the data plane is architected, as many different data plane architects may be used to implement embodiments of the invention.

The VRF 36 and NRE 37 may implement processes to enable them to implement route updates. For example, the NRE may include a MultiProtocol (MP) BGP process to advertise and receive advertised routs. The NRE may also include a Route Designator (RD) Task process which is configured to obtain the correct Virtual Router ID for a given import Route Target (RT) when a BGP route update is received.

The VRF 36 may include a RD Task process configured to filter routes by applying a per-VRF route import and route export policy. The RD Task may be configured to implement the export policy described above to implement an embodiment of the invention. The VRF also may include a Routing Protocol process configured to forward routing updates to the VPN sites 14 and receive route updates from the VPN sites. The VRF may also include a Real Time Manager process configured to manage the creation of interfaces on the network element.

In the embodiment shown in FIG. 4, the VRF includes a FIB Manager process that is configured to interface with a FIB agent 62 in the data plane to program the routes into the FIB in the data plane. By programming routes into the FIB, data that is received by the network element may be forwarded using the rules in the FIB.

Although a particular embodiment of a network element has been described, the invention is not limited in this manner as other types of network elements may be used as well. Accordingly, the embodiment shown in FIG. 4 is to be taken as illustrative only, and not to be interpreted as the only way of implementing the invention.

The functions described above may be implemented as one or more sets of program instructions that are stored in a computer readable memory within the network element(s) and executed on one or more processors within the network element(s). However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of communicating an endpoint address of an Internet Protocol Security (IPSec) Virtual Private Network (VPN) tunnel by a Customer Edge (CE) network element implementing a Multiprotocol Border Gateway Protocol (MPBGP) peering session with another CE network element, the method comprising the steps of:
   receiving route information comprising a route distinguisher:ip-prefix, a peering point address of the MPBGP peering session, and the route target;
   formatting, by the CE network element, a MPBGP route advertisement to include the route distinguisher:ip-prefix, an endpoint address of an IPSec VPN tunnel, and the route target; and
   transmitting the MPBGP route advertisement over the MPBGP peering session to the other CE network element; and
   wherein the step of formatting comprises replacing the peering point address of the MPBGP peering session with the endpoint address of the IPSec VPN tunnel; and
   wherein the peering point address and the endpoint address of the IPSec VPN tunnel are different addresses on the CE network element.

2. The method of claim 1, wherein the endpoint address of the IPSec VPN tunnel is an IP address for an IPSec tunnel terminating at the CE network address other than an MPBGP peering point address for the CE network element.

3. The method of claim 1, wherein the route distinguisher:ip-prefix identifies the route, wherein the route target identifies a VPN with which the route is associated.

4. The method of claim 1, wherein the method further comprises causing the CE network element to segregate routes by implementing Virtual Routing and Forwarding processes (VRFs).

5. The method of claim 1, wherein the MPBGP route advertisement is implemented as a data structure stored in a tangible computer readable medium, the MPBGP route advertisement comprising:
   the route distinguisher:IP-prefix, the endpoint address of the IPSec VPN tunnel, and the route target, and
   wherein the
   IPSec VPN tunnel endpoint address of the IPSec VPN tunnel is inserted as a next hop attribute of the MPGBP route advertisement.

6. The method of claim 5, wherein the route target identifies a VPN associated with the route advertisement, and wherein the route distinguisher identifies a unique address within the enterprise for the case of overlapping IP addresses among VPNs.

7. The method of claim 6, wherein the format of the route advertisement is <RD:prefix, VPN-nh, RT>, in which RD:prefix is the route distinguisher and ip prefix, VPN-nh is the IPSec VPN tunnel endpoint address, and RT is the route target.

8. The method of claim 6, wherein the IPSec VPN tunnel endpoint address is a public address of a Customer Edge network element configured to implement the VPN tunnel on behalf of at least one VPN site.

9. A network, comprising:
   a Group Controller Key Server (GCKS),
   a plurality of Customer Edge (CE) network elements, each of the CE network elements having an established secure control channel between a Multiprotocol Border Gateway Protocol (MPBGP) routing peering endpoint address on the CE and a MPBGP routing peering endpoint address on the GCKS, each of the CE network elements also having at least one established secure data channel having a secure data channel endpoint address other than its MPBGP routing peering endpoint address;
   wherein each of the CE network elements includes a routing table containing routing information correlating routes with the secure data channel endpoint addresses of the other CE network elements; and
   wherein each of the CE network elements is configured to transmit MPBGP route advertisements including a route distinguisher:IP-prefix, its own secure data channel endpoint address, and a route target.

10. The network of claim 9, wherein the CE network elements are all associated with an enterprise.

11. The network of claim 9, wherein the secure data channels are formed using IPSec.

12. The network of claim 9, wherein the secure data channels use a common key obtained from the GCKS.

13. The network of claim 9, wherein a BGP route export policy is set on each of the CE network elements to change a MPBGP peering point address in route advertisements to be transmitted to the endpoint address of the IPSec VPN tunnel.

14. The network of claim 9, wherein the MPBGP route advertisement is implemented as a data structure stored in a tangible computer readable medium, the MPBGP route advertisement comprising:

the route distinguisher:IP-prefix, the endpoint address of the IPSec VPN tunnel, and the route target, and wherein the IPSec VPN tunnel endpoint address of the IPSec VPN tunnel is inserted as a next hop attribute of the MPGBP route advertisement.

15. The network of claim 14, wherein the route target identifies a VPN associated with the route advertisement, and wherein the route distinguisher identifies a unique address within the enterprise for the case of overlapping IP addresses among VPNs.

16. The network of claim 15, wherein the format of the route advertisement is <RD:prefix, VPN-nh, RT>, in which RD:prefix is the route distinguisher and ip prefix, VPN-nh is the IPSec VPN tunnel endpoint address, and RT is the route target.

17. The network of claim 15, wherein the IPSec VPN tunnel endpoint address is a public address of a Customer Edge network element configured to implement the VPN tunnel on behalf of at least one VPN site.

* * * * *